United States Patent [19]

Jada et al.

[11] Patent Number: 4,671,990

[45] Date of Patent: Jun. 9, 1987

[54] PROCESS FOR THE PRODUCTION OF POLYMERS FROM SILICON ALKOXIDES

[75] Inventors: Sivananda S. Jada; Robert T. Hucks, Jr., both of Englewood, Colo.

[73] Assignee: Manville Corporation, Denver, Colo.

[21] Appl. No.: 881,998

[22] Filed: Jul. 1, 1986

[51] Int. Cl.$^4$ .............................................. B32B 7/00
[52] U.S. Cl. .................................. 428/266; 428/268; 428/273; 428/288; 428/290; 428/429; 428/447; 528/12; 528/20
[58] Field of Search ............... 428/266, 268, 273, 288, 428/290, 429, 447; 528/12, 20

[56] References Cited

U.S. PATENT DOCUMENTS 4,587,159  5/1986  Gutek .................................. 428/266

Primary Examiner—Marion C. McCamish
Attorney, Agent, or Firm—John D. Lister; Cornelius P. Quinn; Gregory A. Evearitt

[57] ABSTRACT

Polymeric silicon alkoxide solutions are produced and then stabilized by the addition of calcium acetate. The calcium acetate serves to prevent the rapid evaporation of the polymerized silicon solution when applied as a coating to various substrates. Glass fiber substrates are preferred.

10 Claims, No Drawings

PROCESS FOR THE PRODUCTION OF POLYMERS FROM SILICON ALKOXIDES

FIELD OF THE INVENTION

This invention relates to a novel process for the production of polymeric substances from silicon alkoxides, and more particularly the production of glass-like films and coatings from silicon alkoxides. It also relates to a process for coating a substrate with a polymeric based coating, in particular a glass-like film coating.

BACKGROUND OF THE INVENTION

Various substances have been developed in the past for use as coatings and films to be applied to metal, glass, and ceramic substrates by simple commercial processes such as spraying, dipping, or spinning. Typically, such substances developed for use as coating and films were organic polymer based coatings. While some organic polymer based materials found some degree of commercial acceptance, many of them had very limited performances in hostile environments, e.g. high temperature, corrosive, or abrasive environments.

In recent years there has been a continuing interest in developing silicon-based polymeric coatings, i.e. glass-like coatings, as substitutes for organic-polymer based ones. Ideally, such a coating should be refractory, corrosion resistant, electrically insulating, flexible enough to be coated on a wire, and also be applicable at low temperatures compatible with the desired substrate.

Typically, these silicon basec coatings are made by first dissolving silicon alkoxide species represented by the general formula Si(OR)$_4$, wherein R typically represents an alkyl radical, in an alcohol solvent and then at least partially hydrolyzing the silicon alkoxide in the presence of water, usually in a stoichiometric molar excess amount. The hydrolysis can be typically represented by the following equation:

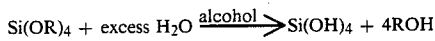
(1)

Thus, according to equation (1) above, by the standard method one achieves predominantly a tetrahydroxy-substituted silicon molecule. These partially hydrolyzed silicon alkoxide molecules are then polymerized to form a glass-like network linked by bridging oxygen atoms.

Dilute solutions of the polymerized network (2-5 equivalent wt % oxides) can be applied to various substrates by dipping, spinning, and drying operations. When applied to a substrate, the glass-like polymers react chemically with the surface and thus cause complete wetting and subsequent adherence to the surface of the substrate. The microporous silica-like glass film can be converted to a dense like glass film by heating the coated substrate at a temperature of about 60° C. for at least 12 hours.

Even though the use of an alcohol is required in the silicon polymer formation and subsequent dilution steps, a difficulty arises from its use because of the fact that the presence of alcohol lowers the vapor pressure of the silicon polymer solution. This is because the low vapor pressure causes the rapid evaporation of the silicon solution during the drying process after it is applied as a coating to a substrate. The rapid evaporation causes the glass-like silicon polymer to lose its effectiveness as a coating and also causes the formation of voids and cracks in the coating due to the drying stresses generated by the evaporation of volatiles or other low molecular weight intermediate compounds from gel micropores in the polymer.

What is needed is a process for making and applying a polymerized silicon coating which prevents or eliminates the problem of rapid evaporation of the coating during its drying.

BRIEF SUMMARY OF THE INVENTION

In accordance with the present invention, Applicants have discovered that a solution of polymerized silicon alkoxide can be stabilized for suitable application as a glass-like coating for a wide variety of substrates without encountering the evaporation problem by adding calcium acetate thereto.

Applicants' inventive process comprises mixing together an alcohol and silicon alkoxide in the presence of an esterification catalyst and thereafter adding a carboxylic acid to the mixture to form a polymeric network of silicon alkoxide. Calcium acetate is then added in an amount from about 0.1-2 wt % of the weight of the polymerized silicon alkoxide solution.

If desired, the polymerized silicon alkoxide solution can be diluted with an inert diluent, preferably a mixture of alcohol and water, before the calcium acetate is added in order to economize on the amount of coating which needs to be applied to a particular substrate.

The use of Applicants' invention prevents the rapid evaporation of the polymerized silicon alkoxide solution during drying after being applied as a coating to any suitable substrate. Furthermore, the drying conditions are considerably lowered to room temperature for less than 4 hours compared to the previously stated conventional conditions of 60° C. for 12 hours or longer. Finally, the formation of voids and cracks in the coating during the drying process is prevented.

Other features and aspects of the invention, as well as their benefits, will be made clear in the more detailed description of the invention which follows.

DETAILED DESCRIPTION OF THE INVENTION

Generally, the silicon alkoxides used in the invention are represented by the general formula:

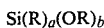

wherein each R independently represents a 1-9 carbon hydrocarbyl radical, preferably a 1-6 carbon linear alkyl radical, and most preferably an ethyl radical, and wherein a represents an integer from 0 to 2, and b represents an integer from 2 to 4 with the proviso that the sum of a and b does not exceed 4.

Representative but non-limiting examples of compounds falling within the structural formula Si(R)$_a$(OR)$_b$ are: tetramethoxysilane, tetraethoxysilane, methyltrimethoxysilane, ethyltriethoxysilane, and amyltriethoxysilane.

The water used in hydrolyzing and condensing the silicon alkoxide molecules in the present invention is generated in situ through the esterification reaction of a carboxylic acid with an alcohol. Such a reaction is well known to those skilled in the art and hence does not require a detailed explanation herein. Such a reaction may be conducted in the presence of any suitable acid or base esterification catalyst. An acid catalyst, typically mineral acids such as HCl (most preferred) and H₂SO₄, is used.

It is preferable in the present invention that the alcohol employed in the esterification reaction will correspond to the R portion of the silicon alkoxide. For example, with tetraethoxysilane, ethanol will be preferably used. In general though, as with the alkoxides, the higher the hydrocarbon number in the alcohol, the slower will be the hydrolysis process for the polymeric network formation.

The silicon alkoxide hydrolysis and condensation reaction is usually carried out in the presence of some kind of polar organic solvent. Such a solvent is used to ensure adequate miscibility between the alkoxide and the water used for hydrolysis. In the present invention, the particular alcohol used in the esterification reaction can be advantageously used for that purpose.

Additionally, the silicon alkoxide hydrolysis is usually carried out in the presence of a suitable catalyst, preferably an acid compound such as the ones used to catalyst the prior esterification reaction. As the hydrolysis reaction is typically carried out at a pH in the range of about 1-2.5, to generate a linear polymeric chain, additional quantities of acid such as HCl, H₂SO₄, and HNO₃ may have to be added at this stage beyond the quantity already employed in the prior esterification reaction.

Basic hydrolysis can also be employed, usually being conducted at a pH of about 6-9. Suitable bases are NH₄OH or other equivalent weak bases.

More generally, suitable pH's are in the range of about 1-9, intermediate pH's being achieved by the addition of suitable buffer systems, the precise choice being composition dependent as is fully conventional.

In a preferred embodiment of the present invention, it has been found beneficial to employ two moles of H₂O in the hydrolysis reaction. The two moles of water are easily achieved and made constant through the reaction of two moles of carboxylic acid and two moles of alcohol in the esterification reaction.

It has also been found preferable in the present invention to control the addition of the carboxylic acid to the hydrolysis reaction mixture over a period of time. It is most preferable to add the carboxylic acid to the hydrolysis reaction mixture over about a 8 hour time period.

Once the polymeric network of silicon alkoxide is formed, it can be diluted, if desired, by adding thereto an inert diluent, preferably a solution consisting essentially of alcohol and water in a weight ratio of alcohol to water of about 1:1, in an amount of from about 12 to about 15 wt % of the total silica content of the polymerized silicon alkoxide solution.

After the polymeric network is formed, and after the dilution step, if carried out, calcium acetate is added to the polymerized silicon alkoxide solution in an amount of from 0.1 to 2 wt % of the solution. Hydrated forms of calcium acetate such as the pentahydrate form may be used.

In another embodiment of the present invention, the thus formed polymeric network containing calcium acetate can then be applied as a solution to a substrate to achieve the advantageous coating or film of this invention in a one-step, preferably low temperature operation to achieve a readily varied thin coating in the range of 0.1-100 microns, or other thickness as desired.

The solutions can be applied to the substrate in any conventional fashion such as dipping, spraying, or spinning (especially in conjunction with semiconductor substrates).

Illustratively, thickness control can be achieved, e.g., in a dipping operation, by control of any of the following parameters: (a) concentrating the polymerized solution; (b) viscosity of the polymerized solution; (c) dipping speed; (d) dipping angle; etc. In a spraying operation, the first two parameters as well as the spraying time can also be used to control thickness.

The amount of solution applied to the substrate in a given operation will be fully conventionally determined, e.g., by conventional consideration of the amount of ingredients in solution. The solution is normally applied at room temperature but, of course, can be used in any given application. Similarly, it is also possible to preheat the substrate and apply the solution thereto.

The solution application onto the substrate can be carried out under normal atmospheric conditions. However, when dictated by conventional considerations, these steps can be carried out in an inert, reducing, or oxidative atmosphere, or even in vacuo, if necessary. The applied film or coating dries rapidly which is a significant advantage for commercial application.

The films and coatings made by the process of this invention can be applied to substrate surfaces where it is desired to render the same insulating, abrasion resistant, impervious, fire resistant, etc. The normal application is for protection of the underlying substrate. However, optical applications are also possible by suitable conventional control of the thickness of the layer.

There is essentially no limitation on the substrate surfaces themselves to which the films or coatings made by the process of the present invention can be applied. Metals, glasses, ceramics, semi-conductors, etc. can all be coated.

The thus coated substrate in comparison to substrates containing conventional partially polymerized silicon alkoxide solutions (which lack calcium acetate) as a coating are afforded greater physical and chemical protection because the calcium acetate modified silicon based coatings do not experience the rapid evaporation rates which the others do.

The following examples further illustrate the present invention.

EXAMPLE 1

A poly(tetraethylorthosilicate) solution was prepared as follows:

Six (6) moles of ethyl alcohol (denatured), 2 moles of tetraethoxysilane (TEOS), and 0.02 moles of concentrated HCl were added together. While the reaction mixture was constantly agitated, glacial acetic acid, 2 moles divided into 4 aliquots, was added over a period of 8 hours with an interval of 2 hours for each aliquot addition. The silica content in the condensed solution was 57.68% (calculated). The polymeric solution had a viscosity of 9-11 cps (by Brookfield Viscometer) and the average number molecular weight was 1352.4.

EXAMPLE 2

A solution comprising 14.45% (calculated) silica was prepared by diluting 375 ml of a poly(tetraethylorthosilicate) as prepared in Example 1, with a mixture of equal amounts of denatured alcohol and water, i.e., 562.5 ml.

EXAMPLE 3

To 444.2 grams of diluted polymeric solution, prepared as described in Example 2, 1.11 grams of calcium acetate pentahydrate was added and stirred until the solution became clear.

EXAMPLE 4

The diluted polymer solutions as described in Examples 2 and 3 were taken in separate 150 ml beakers to test their drying time at room temperature. The inventive polymeric solution with calcium acetate pentahydrate as an additive gelled in 3 hours with very little volume shrinkage and no cracks. The non-inventive polymeric solution without calcium acetate pentahydrate additive gelled and hardened in more than 2 days with more than 75% volume shrinkage and cracked into several small pieces.

EXAMPLE 5

At 50° C., with a shear rate of 7.92 (sec$^{-1}$), 8 ml of the inventive polymeric solution of Example 3 gelled in less than 1 minute. Under identical conditions, the non-inventive polymeric solution of Example 2, where no calcium acetate additive was used, gelled after 38 hours with more than 75% volume loss.

EXAMPLE 6

A diluted solution comprising 14.45% (calculated) silica mordified with calcium acetate pentahydrate was prepared using the procedure described in Example 3. A 0.36 g, 11.0 cm diameter fiber glass mat with binder burned off (30 minutes at 500° C.) was dipped into the solution and on removal excess solution was drained out of the glass mat by applying suction. The mat was then air dried for 2 hours at room temperature and postcured in an oven heated at 120° C. for 20 minutes. The weight of coating on the glass mat was found to be 0.40 g.

A 11.0 cm diameter sample of the above inventive treated glass mat was then subjected to a fire test over a gas burner fitted with a circular jet of diameter 35 mm, the sample being held on a support 100 mm metal ring, 50 mm above the burner nozzle. The temperature of the flame at the sampe position was determined as 950° C. No smoke, no fire structure damage, and no shrinkage of the inventive treated glass mat was observed even after 3 hours of continuous firing.

Under an identical firing test, a glass mat coated with polymeric solution without calcium acetate pentahydrate as an additive shrank in 5 minutes. Within 20 minutes, the mat melted with more than 50% shrinkage in diameter.

Reasonable modifications and variations are possible within the scope of the foregoing distance without departing from either the spirit or scope of the invention as defined by the claims.

We claim:

1. A novel process for the production of a polymeric substance from silicon alkoxide comprising in order the steps of:
   (a) mixing an alcohol and silicon alkoxide in the presence of an esterification catalyst;
   (b) adding to said mixture in 1(a) a carboxylic acid in order to form a polymeric network of silicon alkoxide; and
   (c) adding calcium acetate to said polymeric network of silicon alkoxide formed in 1(b) in an amount of from about 0.1-2 wt % of the weight of said polymeric network of silicon alkoxide solution.

2. A process according to claim 1 wherein said silicon alkoxide is tetraethoxysilane.

3. A substrate coated with the polymeric substance of claim 2.

4. A coated substrate according to claim 3 wherein said substrate is a fiber glass mat.

5. A process according to claim 1 wherein said polymeric network of silicon alkoxide formed in step 1(b) is diluted with an inert diluent before said calcium acetate is added in step 1(c).

6. A process according to claim 5 wherein said inert diluent is added in an amount from about 12 to about 15 wt % of the total silica content of said polymeric network of silicon alkoxide solution.

7. A process according to claim 5 wherein said inert diluent consists essentially of a mixture of alcohol and water in a weight ratio of 1:1.

8. A process according to claim 1 wherein said carboxylic acid is added to said mixture in 1(b) over a period of eight (8) hours.

9. A substrate coated with the polymeric substance of claim 1.

10. A coated substrate according to claim 9 wherein said substrate is a fiber glass mat.

* * * * *